United States Patent
Chen et al.

(10) Patent No.: US 6,220,337 B1
(45) Date of Patent: Apr. 24, 2001

(54) HEAT PIPE CIRCUIT TYPE THERMAL BATTERY

(76) Inventors: Shi-Li Chen, 4th Floor, No. 23-9, Alley 48, Lane 493, Wan Ta Road, Taipei; Ming-Jer Hsiao, No. 397, Fu Hsing Road, Nan Tou City 540, both of (TW)

(*) Notice: Subject to any disclaimer, the term of this patent is extended or adjusted under 35 U.S.C. 154(b) by 0 days.

(21) Appl. No.: 09/066,711

(22) Filed: Apr. 27, 1998

(51) Int. Cl.[7] ............... F28D 17/00; F28D 19/00
(52) U.S. Cl. ............... 165/10 A; 165/104.17
(58) Field of Search ............... 62/185; 165/10 A, 165/104.17; 126/361

(56) References Cited

U.S. PATENT DOCUMENTS

| | | | |
|---|---|---|---|
| 2,911,513 | * 11/1959 | MacCraken | 165/10 A |
| 4,119,143 | * 10/1978 | Robinson, Jr. | 165/10 A |
| 4,258,696 | * 3/1981 | Gopal | 165/10 A |
| 4,598,694 | * 7/1986 | Cromer | 126/361 |
| 4,607,498 | * 8/1986 | Dinh | 52/185 |
| 4,609,036 | * 9/1986 | Schrader | 165/10 A |

* cited by examiner

*Primary Examiner*—Ira S. Lazarus
*Assistant Examiner*—Tho Duong
(74) *Attorney, Agent, or Firm*—Dougherty & Troxell

(57) ABSTRACT

Disclosed is a heat pipe circuit type thermal battery which can store, release, and efficiently utilize heat and/or cold. The thermal battery mainly includes an energy storing chamber for containing phase change medium to store or release heat energy via the change of the phase change medium between the solid and liquid phases, a heat pipe circuit formed from a plurality of vertically arranged parallel heat pipes to guide working fluid flowing therein and transfer energy through phase changes of condensing and boiling of the working fluid, and two heat exchangers separately serving as heat source and heat sink. Heat energy contained in flowing fluid in the heat-source heat exchanger is transferred to the working fluid in the heat pipe circuit and then stored in the energy storing chamber. On the other hand, energy stored in the energy storing chamber can be released and transferred to the heat-sink heat exchanger via the heat pipe circuit. With superior thermal conductivity, the heat pipes can automatically and effectively store or release energy just like a battery without the need of electrical power.

2 Claims, 15 Drawing Sheets

HEAT PIPE CIRCUIT TYPE THERMAL BATTERY

BACKGROUND OF THE INVENTION

The present invention relates to a thermal battery formed from a heat pipe circuit and functioning like a battery to store or release heat or cold energy. Heat or cold energy is stored in the thermal battery and can be released for use later. Or, in the event too much heat or cold energy is supplied during the utilization of heat or cold energy, extra and unused heat or cold energy can be stored in the thermal battery. On the contrary, in the event insufficient heat or cold energy is supplied, additional heat can be provided by the thermal battery for use. With the thermal battery of the present invention, energy can be fully utilized.

It is known that a lot of energies, either heat or cold energy, are not effectively used or stored during utilization of the energies and therefore lose in the atmosphere and form waste heat which causes environmental pollution, poor working efficiency of equipment, and undesirable waste of energy. Proper recuperation, storage, and utilization of the otherwise lost heat or cold energies will not only minimize possible environmental pollution but also enhance the efficiency of energy utilization and achieve the object of energy saving.

To store and utilize heat or cold energies, an active control is generally designed for a heat storage or regeneration system. That is, in the system design of heat storage, a pump is included to transfer heat energy from a high temperature heat source to the heat storage via flowing working fluid. To utilize the stored heat energy, an electromagnetic valve is used under control to change flow path of the working fluid, so that energy stored in the heat storage is released to and used by a low temperature heat sink. There are two drawbacks found in such type of heat storage. First, the need of an operating pump to transfer the working fluid and an controlled electromagnetic valve to change the energy storing or releasing ability of the working fluid causes increased operation cost and power consumption. The heat storage shall be unworkable in case of a system failure. Second, change of the energy storage and release ability of the conventional heat storage is basically relied on the system piping design and therefore only two functions, i.e. energy storage and energy release, are available in its operating modes. It is impossible for both the heat supply side and the heat utilization side of the heat storage to operate at the same time during the heat utilization.

SUMMARY OF THE INVENTION

It is therefore a primary object of the present invention to provide a thermal battery in which a passive type of control is adopted to eliminate drawbacks found in the conventional heat storage and no pump and electromagnetic valve are required. Moreover, apart from storing and releasing energy, the thermal battery of the present invention also allows operation of heat energy supply side and heat energy use side at the same time. That is, during the heat energy utilization, when extra heat energy that is more than the amount needed by the heat energy use side has been provided by the heat supply side, the heat not used by the heat energy use side may be stored in the thermal battery; and, when the heat energy provided by the heat supply side is insufficient for use by the heat energy use side, additional heat may be supplemented by the thermal battery. On the occasion the present invention is applied to provide cold energy, it is in the form of a thermal battery for cold storage.

BRIEF DESCRIPTION OF THE DARWINGS

The above and other objects of the present invention as well as the structure and principles applied to achieve these objects and many other functions of the present invention can be best understood by referring to the following detailed description of the preferred embodiments and the accompanying drawings, wherein FIG. 1 is a sectional view of the present invention;

Figure 14:
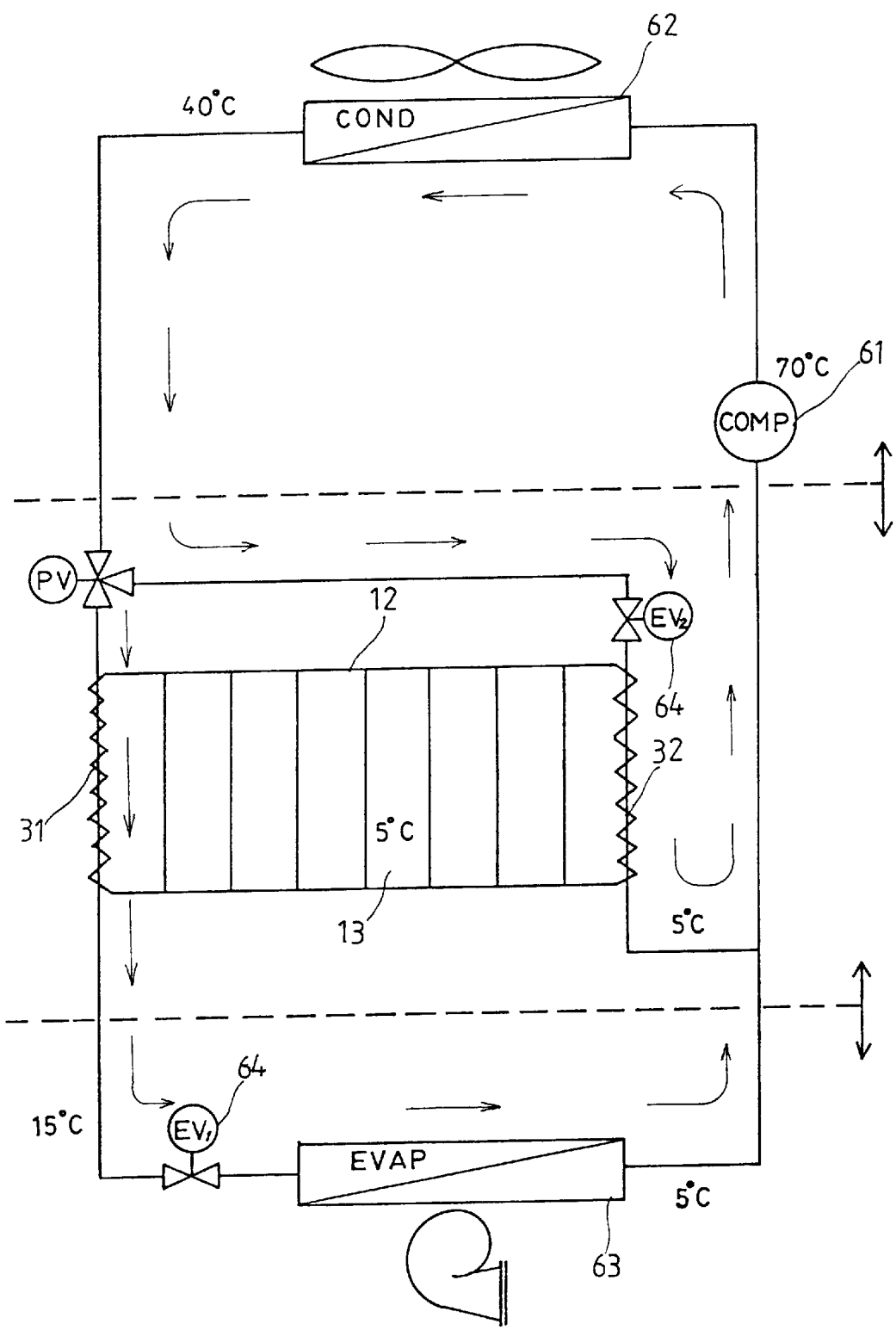
Figure 15:
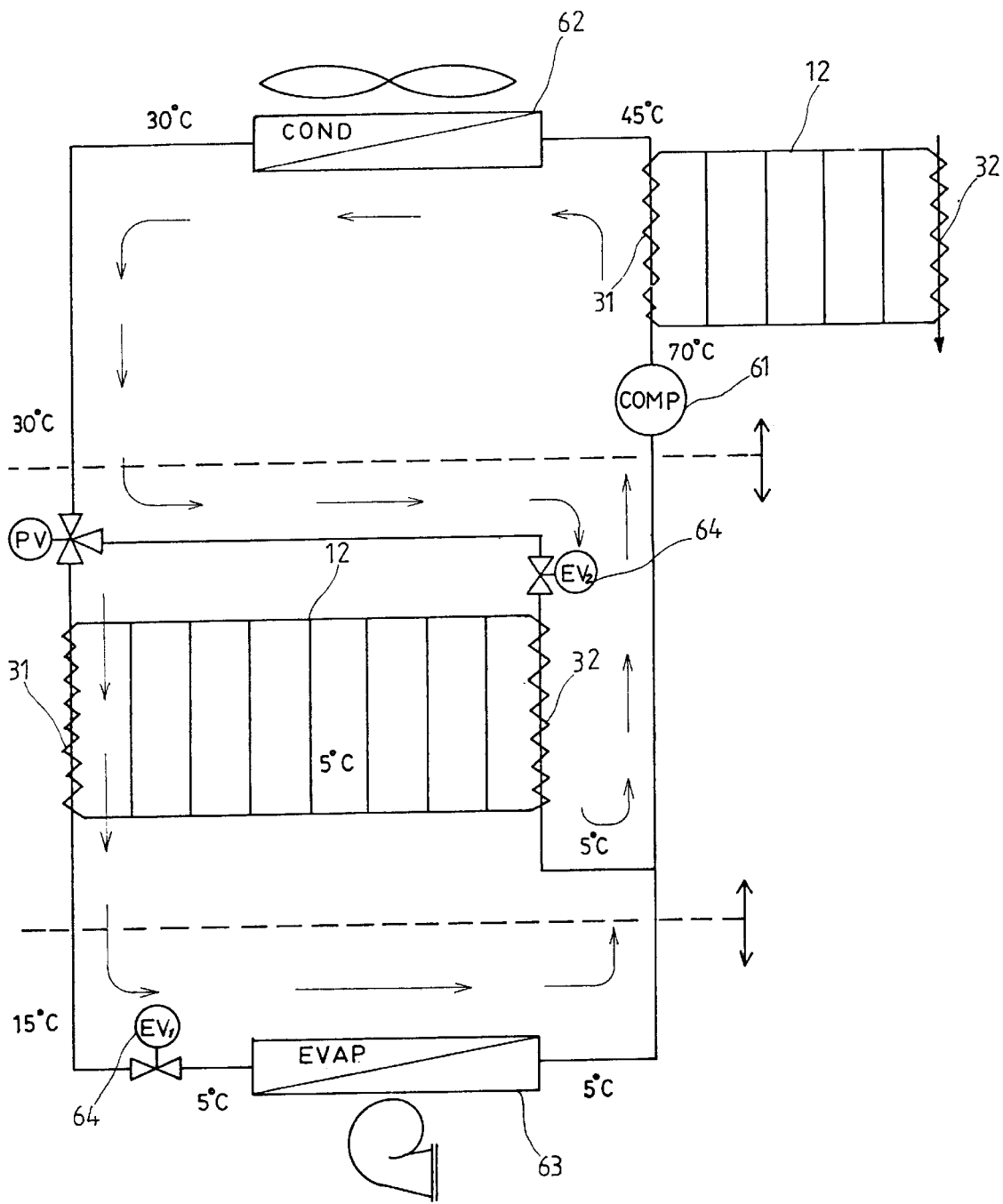

FIG. 14 illustrates the application of the thermal battery for cold storage according to the present invention to store and release cold at the same time; and FIG. 15 illustrates the application of the thermal battery for heat storage and the eutectic salt thermal battery for cold storage according to the present invention in recuperating heat at the exhaust pipe of a compressor of an air-conditioning system, subcooling the refrigerant of the system, and air conditioning.

DETAILED DESCRIPTION OF THE PREFERRED EMBODIMENTS

Figure 1:
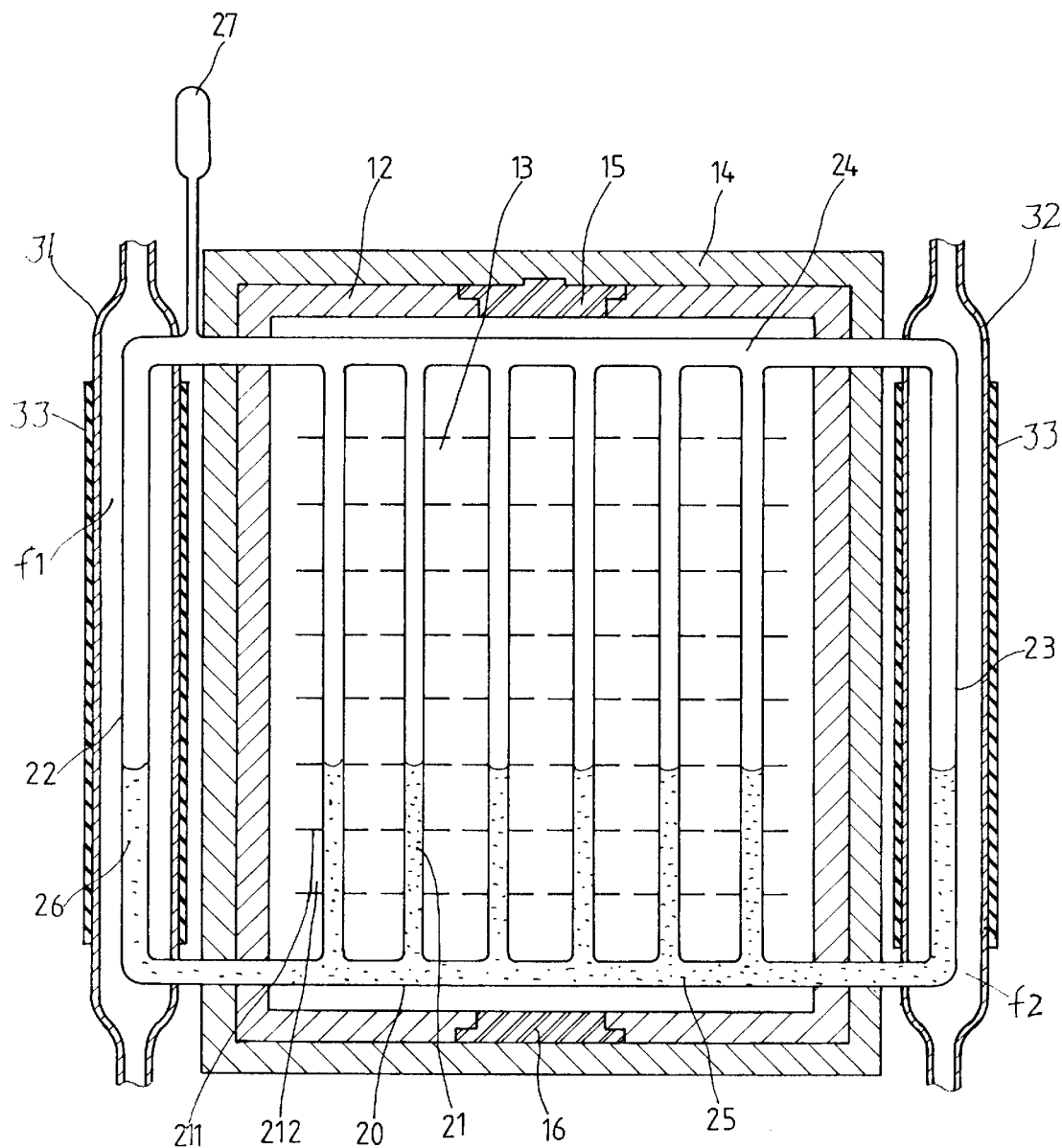

Please refer to FIG. 1 in which a sectional view of a thermal battery according to the present invention is shown.

The thermal battery mainly includes an energy storing chamber 12 and a heat pipe circuit 20. The energy storing chamber 12 is filled with phase change medium (PCM) 13, so that heat energy can be stored or released via melting or freezing of the phase change medium 13 between solid and liquid states.

Insulating material 14 is provided to cover outside of the energy storing chamber 12 to prevent heat loss. A top cover 15 is provided at the top of the chamber 12 for replenishing the phase change medium 13 into the chamber 12, and a drain hole 16 is provided at the bottom of the chamber 12 for draining the phase change medium 13 from the chamber 12.

The heat pipe circuit 20 includes three parts, namely, a group of parallel heat pipes 21 vertically disposed inside the energy storing chamber 12, vertical high-temperature heat transfer pipe 22 and vertical low-temperature heat transfer pipe 23 separately located at outside of the chamber 12, and upper horizontal pipe 24 and lower horizontal pipe 25 extending between the vertical high/low temperature heat transfer pipes 22, 23 outside the chamber 12 to connect and communicate the group of vertically paralleled heat pipes 21 inside the chamber 12 and the vertical high/low temperature heat transfer pipes 22, 23.

The parallel heat pipes 21 have external short fins 211 densely provided around their outer surfaces to increase thermal conductive contact areas thereof. These short fins 211 also divide inner space of the energy storing chamber 12 into multiple energy storing cells 212. The phase change medium 13 becomes molten or frozen in these energy storing cells 212 to store or release heat energy.

The vertical high/low temperature heat transfer pipes 22, 23 outside the energy storing chamber 12 are used to exchange heat with high-temperature and low-temperature flowing fluid, respectively. They have short fins 211 or spiral flutes provided around inner and outer surfaces to obtain enhanced heat transfer performance when the flowing fluid is gas (air), vapors, or liquid (water or liquid coolant).

Adequate type and amount of working fluid 26 is filled in the heat pipe circuit 20. The adequate working fluid 26 includes, but not limited to, water and refrigerant (such as freon). A pressure-limit safety chamber 27 located outside the energy storing chamber 12 is connected to the vertical high-temperature heat transfer pipe 22 to timely serve as a room for receiving expanded working fluid 26.

High-temperature heat exchanger 31 and low-temperature heat exchanger 32 are provided at two outer sides of the energy storing chamber 12 to serve as flow passages for high and low temperature flowing fluid (such as air, water, or freon), respectively, to flow therethrough. The high-temperature heat transfer pipe 22 and the low-temperature heat transfer pipe 23 extend through the heat exchangers 31 and 32, respectively, to exchange heat with the high and low temperature flowing fluid in the heat exchangers 31, 32, respectively. Thermal insulating material 33 is provided around outer surfaces of the high and low temperature heat exchangers 31, 32 to prevent heat dissipation during operation or shutoff of the thermal battery.

Figure 2:
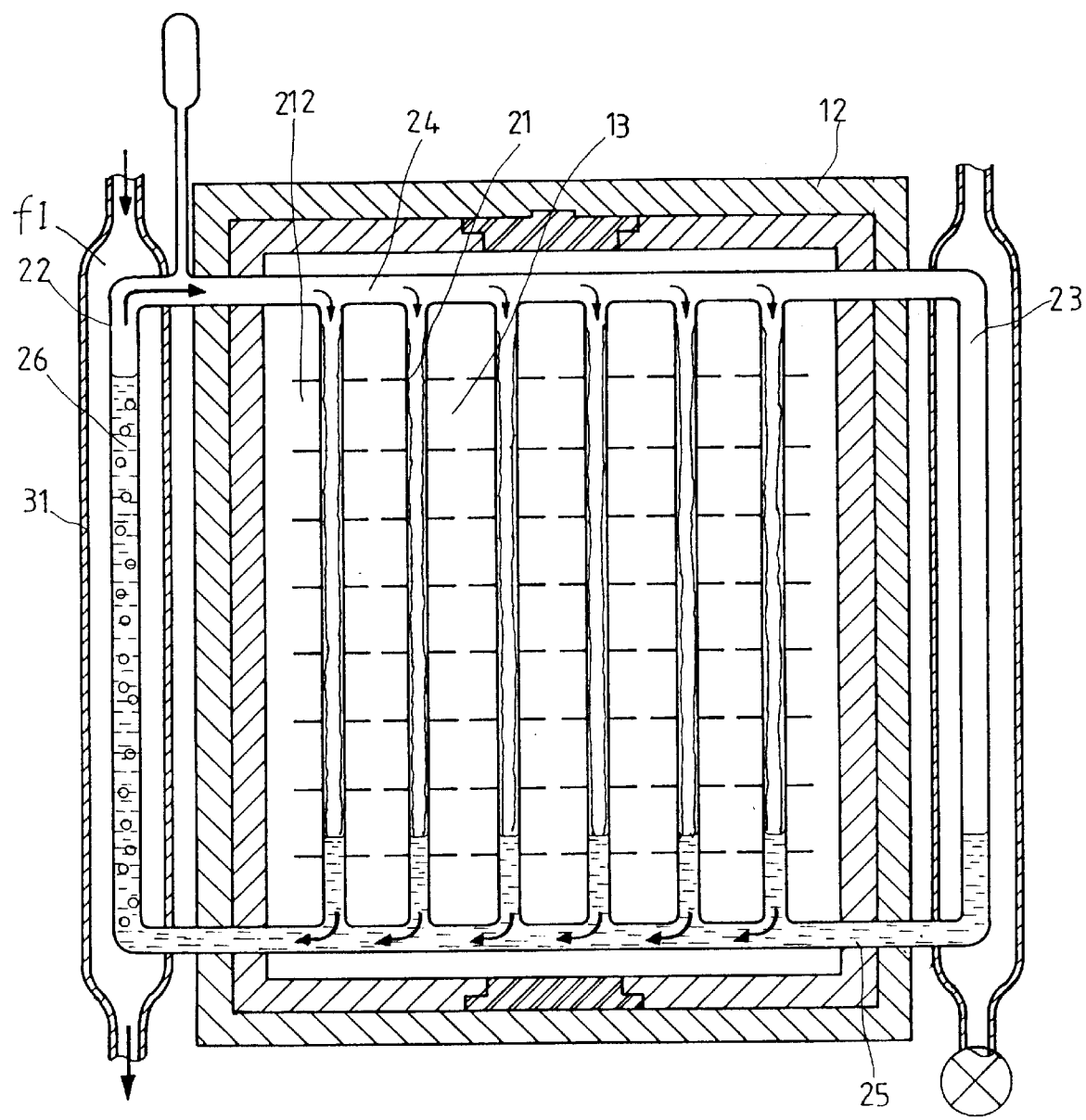
FIG. 2 is a sectional view explaining the working principles of the present invention for heat storage.

FIG. 2 shows the manner in which the thermal battery of the present invention operates to store heat energy. Please refer to FIGS. 1 and 2 at the same time. When an amount of high temperature flowing fluid F1 flows into the high-temperature heat exchanger 31 in a direction as shown by the arrows in FIG. 2, heat contained in the fluid F1 is transferred to the working fluid 26 inside the vertical high-temperature heat transfer pipe 22. The working fluid 26 having absorbed heat becomes boiled and produces gaseous working fluid which flows upward due to its buoyancy into the upper horizontal pipe 24 and then downward into the vertically paralleled heat pipes 21 in the energy storing chamber 12. At this point, the gaseous working fluid condenses and releases heat to melt solid phase change medium 13 into liquid medium in the energy storing cells 212 outside the parallel heat pipes 21. Since the condensed liquid working fluid has a density much larger than that of the gaseous working fluid, it flows downward along inner wall surfaces of the vertical heat pipes 21 under gravity and into the lower horizontal pipe 25 and then the vertical high-temperature heat transfer pipe 22 to complete one cycle of flow of the working fluid 26 in the heat pipe circuit 20. Heat released by the gaseous working fluid 26 in the vertically paralleled heat pipes 21 during the course of condensation is absorbed by the energy storing cells 212 inside the energy storing chamber 12 and thereby melts the originally solid phase change medium 13 into liquid. When the solid phase change medium 13 is completely molten into liquid, heat continuously released by the working fluid 26 is stored in the form of latent heat of fusion.

Figure 3:
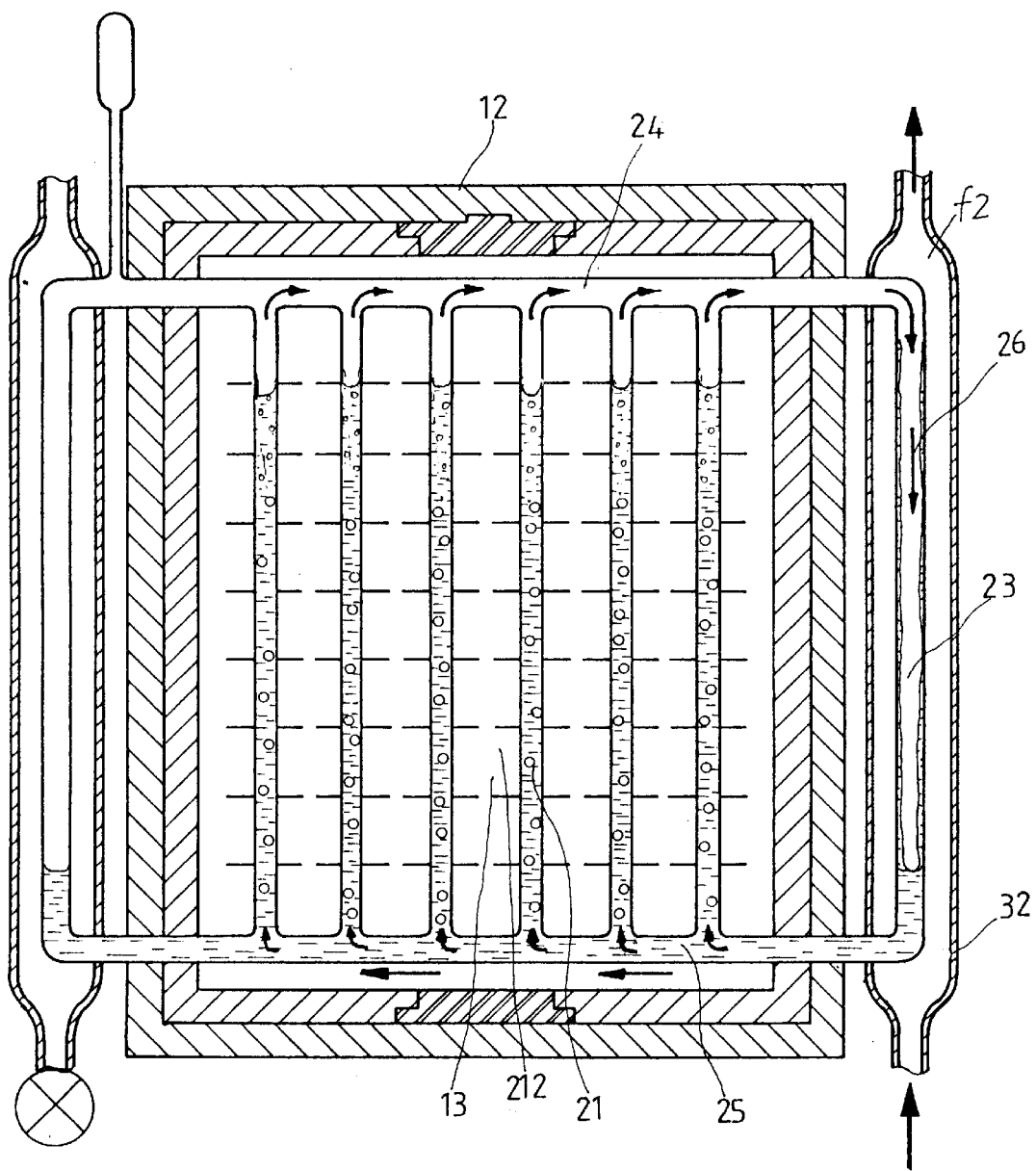
FIG. 3 is a sectional view explaining the working principles of the present invention for heat release.

FIG. 3 shows the manner in which the thermal battery of the present invention operates to release heat energy. Please refer FIGS. 1 and 3 at the same time. When an amount of low temperature flowing fluid F2 flows into the low-temperature heat exchanger 32 in a direction as shown by the arrows in FIG. 3, it absorbs heat in the gaseous working fluid 26 inside the vertical low-temperature heat transfer pipe 23 of the thermal battery and is heated to have increased enthalpy value. At this point, the originally gaseous working fluid 26 condenses into liquid working fluid which forms a thin layer of condensate along inner wall surface of the vertical low-temperature heat transfer pipe 23 and then flows downward under gravity into the lower horizontal pipe 25 and then upward into the vertically paralleled heat pipes 21. At this point, the liquid working fluid in the vertically paralleled heat pipes 21 absorbs heat stored in the liquid phase change medium 13 in the cells 212 outside the heat pipes 21 and becomes boiled to produce gaseous working fluid which flows upward due to its buoyancy into the upper horizontal pipe 24 and then downward into the vertical low-temperature heat transfer pipe 23 again to complete one cycle of flow of the working fluid 26 in the heat pipe circuit 20. Heat stored in the liquid phase change medium 13 in the cells 212 is released to the vertically paralleled heat pipes 21 during the course of vaporization and thereby freezes the originally liquid phase change medium 13 into solid state. In brief, heat stored in the liquid phase change medium 13 of the thermal battery is transferred to the low-temperature working fluid 26 flowing through the vertically paralleled heat pipes 21 to boil and evaporate the working fluid 26 and thereby freezes the liquid phase change medium 13 into solid state.

Figure 4:
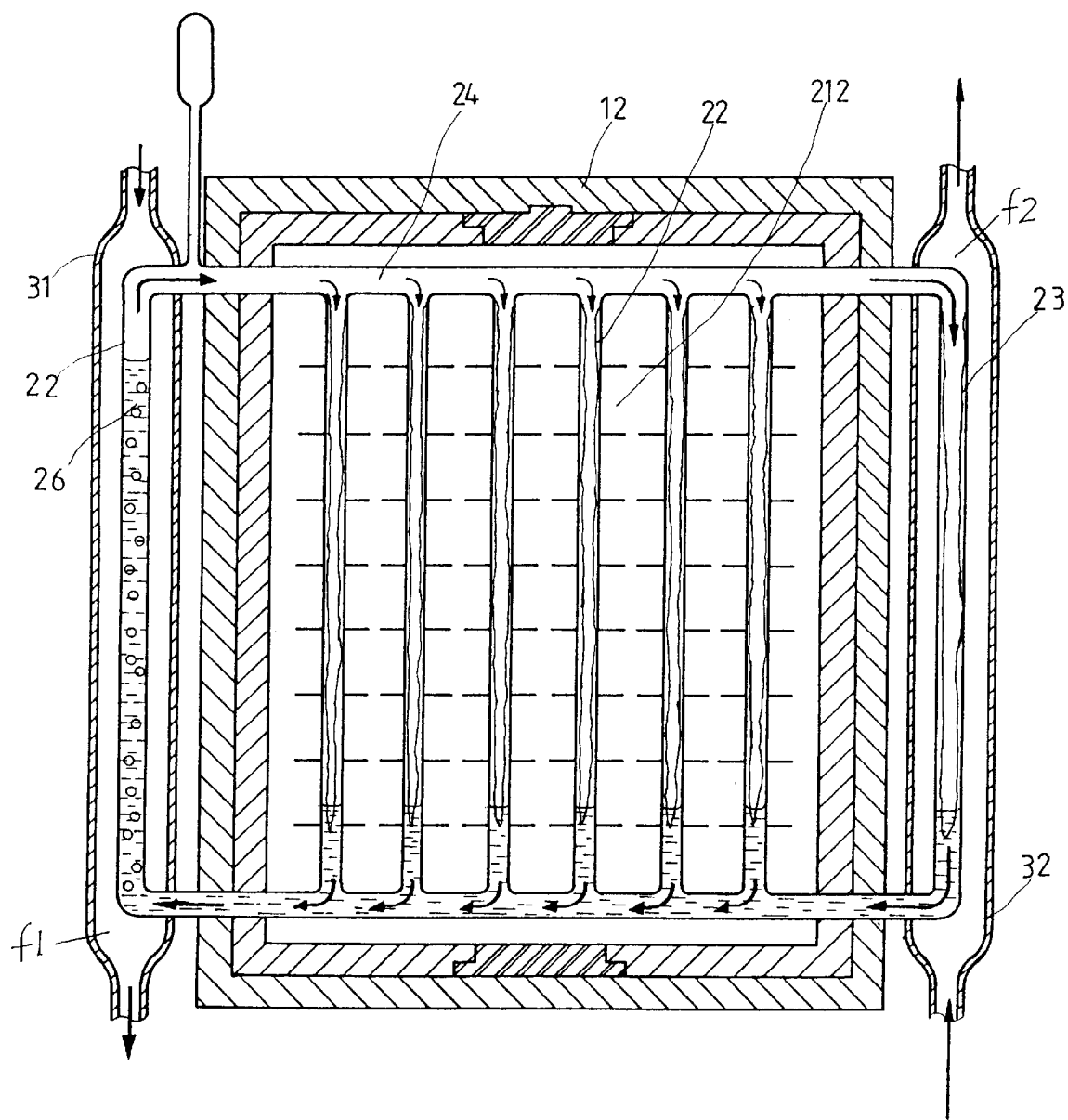
FIG. 4 is a sectional view explaining the working principles of the present invention when the supplied heat is larger than the required heat.

The above-described two operation modes, that is, the energy storage mode of storing heat energy contained in the high-temperature flowing fluid into the thermal battery (see FIG. 2) and the energy release mode of using heat energy stored in the thermal battery by the low-temperature flowing fluid (see FIG. 3), work separately at different time. For a third operation mode that combines the above two operation modes, that is, the thermal battery operates when an amount of high-temperature flowing fluid F1 flows through the high-temperature heat exchanger 31 and an amount of low-temperature flowing fluid F2 flows through the low-temperature heat exchanger 32 at the same time, the operating principles thereof can be explained in three different conditions:

1. When the energy supplied by the high-temperature flowing fluid is higher than the energy to be absorbed by the low-temperature flowing fluid:

Please refer to FIG. 4 which shows the manner in which the thermal battery of the present invention operates under this condition.

When the high-temperature flowing fluid F1 containing large amount of heat flows through the high-temperature heat exchanger 31, the working fluid 26 in the vertical high-temperature heat transfer pipe 22 is boiled and evaporated to produce large amount of vaporized working fluid 26 which flows upward due to its buoyancy and into the upper horizontal pipe 24 and then downward into the vertically paralleled heat pipes 21 inside the energy storing chamber 12 as well as the vertical low-temperature heat transfer pipe 23 outside the chamber 12. A part of the gaseous working fluid 26 flowing into the parallel heat pipes 21 condenses and releases heat energy that is stored in cells 212 in the energy storing chamber 12. Another part of the gaseous working fluid 26 flowing into the low-temperature heat transfer pipe 23 condenses and heat released during the condensation is transferred to the low-temperature flowing fluid F2 via the low-temperature heat exchanger 32. Condensate of the working fluid 26 flows back to the vertical high-temperature heat transfer pipe 22 under gravity and completes one cycle of flow of the working fluid 26 in the thermal battery. Whereby, the thermal battery of the present invention functions to transfer and supply the heat energy in the high-temperature flowing fluid F1 flowing through the high-temperature heat exchanger 31 to the low-temperature flowing fluid F2 and to store any extra heat energy in the thermal battery.

Figure 5:
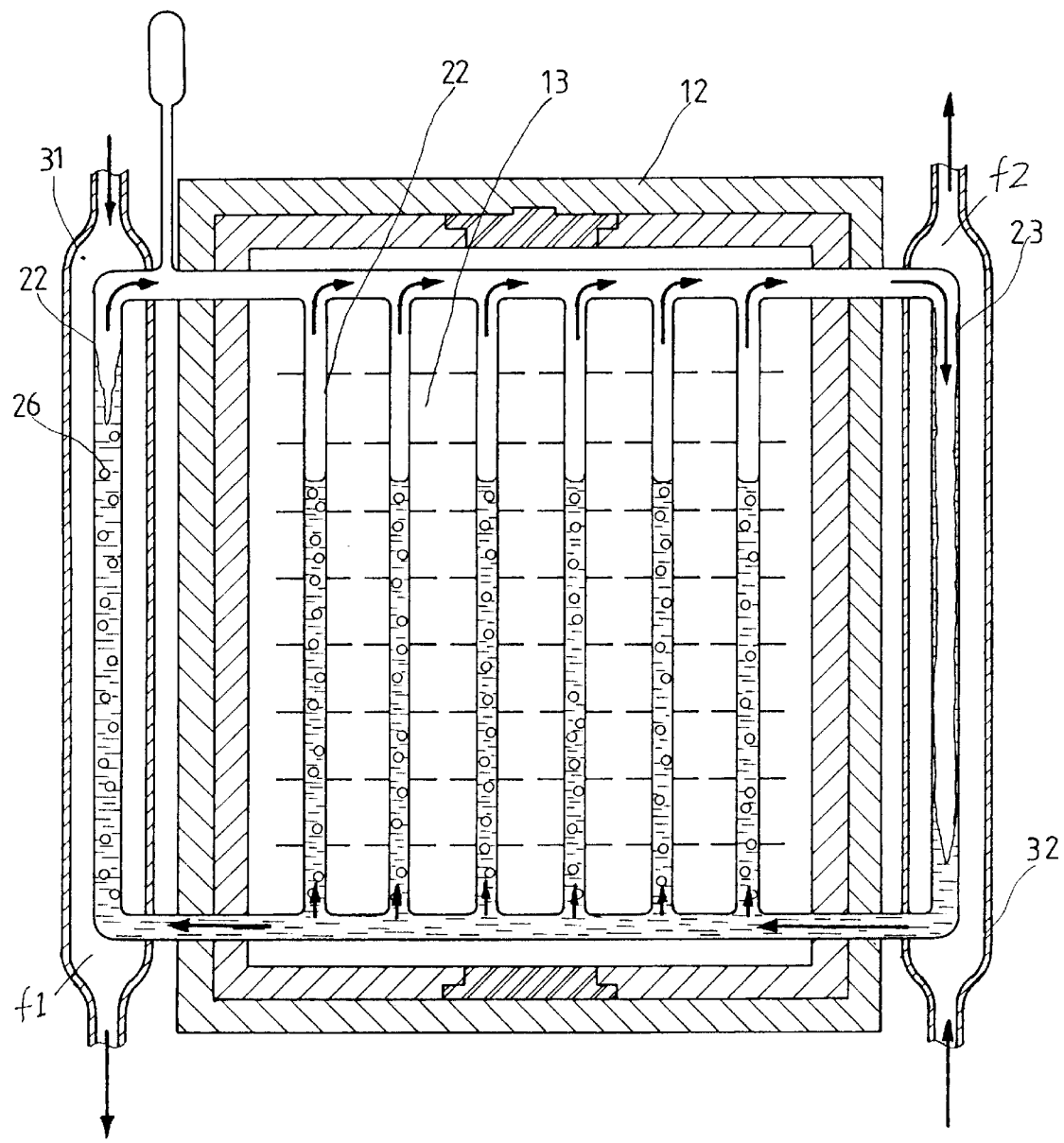
FIG. 5 is a sectional view explaining the working principles of the present invention when the required heat is larger than the supplied heat.

2. When the energy that can be supplied by the high-temperature flowing fluid is lower than the energy to be absorbed by the low-temperature flowing fluid:

Please refer to FIG. 5 which shows the manner in which the thermal battery of the present invention operates under this condition.

When the high-temperature flowing fluid F1 containing a certain amount of heat flows through the high-temperature heat exchanger 31, the working fluid 26 in the vertical high-temperature heat transfer pipe 22 is boiled and evaporated to produce an amount of vaporized working fluid 26 which is not sufficient for use by the low-temperature flowing fluid F2 in the low-temperature heat exchanger 32 to increase its enthalpy value. At this point, the phase change medium 13 in the energy storing chamber 12 releases heat to boil a part of the working fluid 26 in the parallel heat pipes 21 in the chambers 12 and thereby produces gaseous working fluid 26 which flows into the vertical low-temperature heat transfer pipe 23. Heat contained in the gaseous working fluid 26 is absorbed by the low-temperature flowing fluid F2 and the gaseous working fluid condenses. Condensate of the working fluid 26 flows back to the vertical high-temperature heat transfer pipe 22 under gravity and completes one cycle of flow of the working fluid 26 in the thermal battery. Whereby, the thermal battery of the present invention functions to transfer and supply heat energy in the high-temperature flowing fluid F1 to the low-temperature flowing fluid F2 and supplies heat energy stored in the thermal battery to boil and evaporate the working fluid 26 when the heat energy supplied by the high-temperature flow fluid F1 is not sufficient for use by the low-temperature flowing fluid F2.

3. When the energy supplied by the high-temperature flowing fluid is equal to the energy to be absorbed by the low-temperature flowing fluid:

From the principles applied in the above two conditions, it can be understood that when the energy supplied by the high-temperature flowing fluid is equal to the energy needed by the low-temperature flowing fluid, the thermal battery shall operate to boil or evaporate the working fluid 26 only with the heat absorbed by the vertical high-temperature heat transfer pipe 22 from the high-temperature heat exchanger 31. The resultant gaseous working fluid 26 enters the vertical low-temperature heat transfer pipe 23 via the upper horizontal pipe 24 and then condenses. Heat released by the working fluid 26 during condensation is transferred to the low-temperature flowing fluid F2. At this point, no heat energy is stored into or released from the phase change medium 13 in the energy storing chamber 12 of the thermal battery. When the energy stored in the energy storing chamber 12 is cold energy, the battery of the present invention is referred to as a thermal battery for cold storage which has the same operating principles as that applied in the thermal battery for heat storage.

The thermal battery of the present invention including a heat pipe circuit can be used for effective storage and utilization of energy. With the present invention, energy can be saved and used in an efficient manner. Following are applications of the present invention by using it with an air conditioner.

Figure 6:
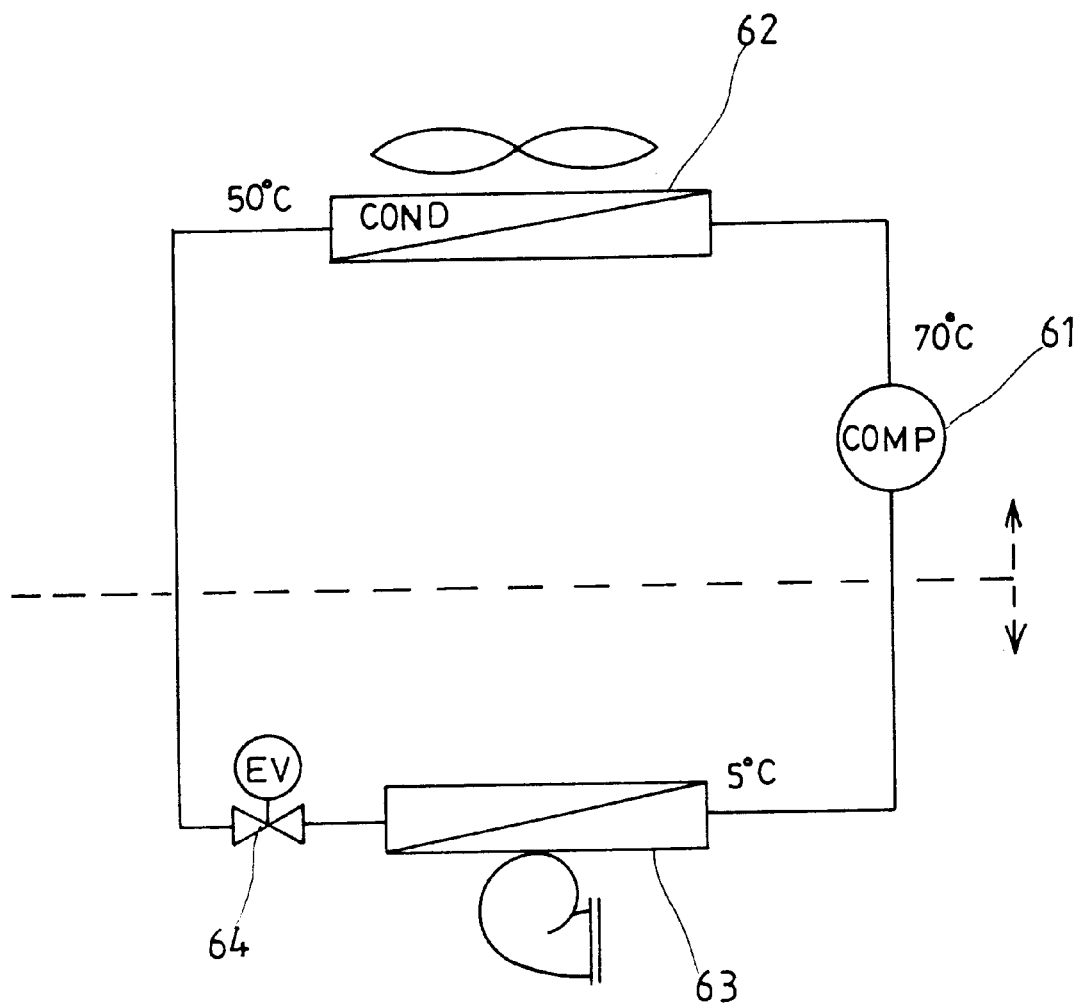
FIG. 6 illustrates a conventional air-cooled direct-expansion air-conditioning system.
Figure 7:
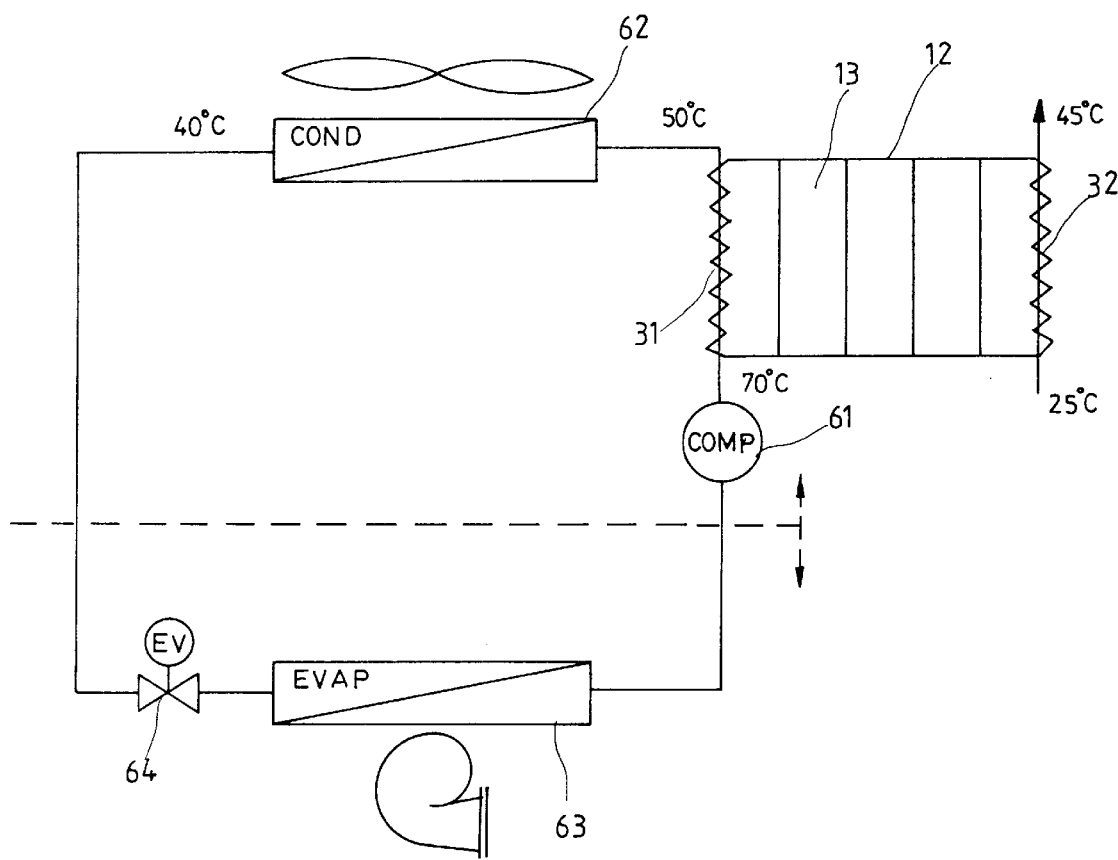
FIG. 7 illustrates the application of the thermal battery of the present invention by connecting it to an exhaust pipe of a heat recuperation system.

Please refer to FIG. 6. An air conditioner is a mechanical vapor compression system comprising a compressor 61, an air-cooled condenser 62, an evaporator 63, and an expansion device 64. When the refrigerant used is R-22 with a condensing temperature of 50° C. and an evaporating temperature of 5° C., a conventional vapor compression system shall have a coefficient of performance (COP) of 4.77. In this type of conventional system, the temperature of superheated refrigerant vapor at an exhaust pipe of the compressor 61 is 70° C. When a thermal battery according to the present invention is connected to the exhaust pipe of the compressor 61, as shown in FIG. 7, energy contained in the superheated refrigerant vapor of 70° C. maybe stored in the thermal battery via the high-temperature heat exchanger 31 and the refrigerant enters the condenser 62 at a temperature of 50° C. and the condensing temperature can be reduced to 40° C. By using the thermal battery as a heat recuperator at the exhaust pipe, the overall COP is 6.56 which is 38% higher compared to the conventional vapor compression system. Moreover, energy stored in the thermal battery may be released via the low-temperature heat exchanger 32 to provide heat required in daily life. For example, the energy may be released to preheat water from 25° C. to 45° C. for bathing or other industrial uses. For this purpose, the phase change medium 13 in the thermal battery may be paraffin, for example, to store or release latent heat that melts or sets the paraffin at 47° C. Alternatively, chemical energy may also be stored for the same purpose.

Figure 8:
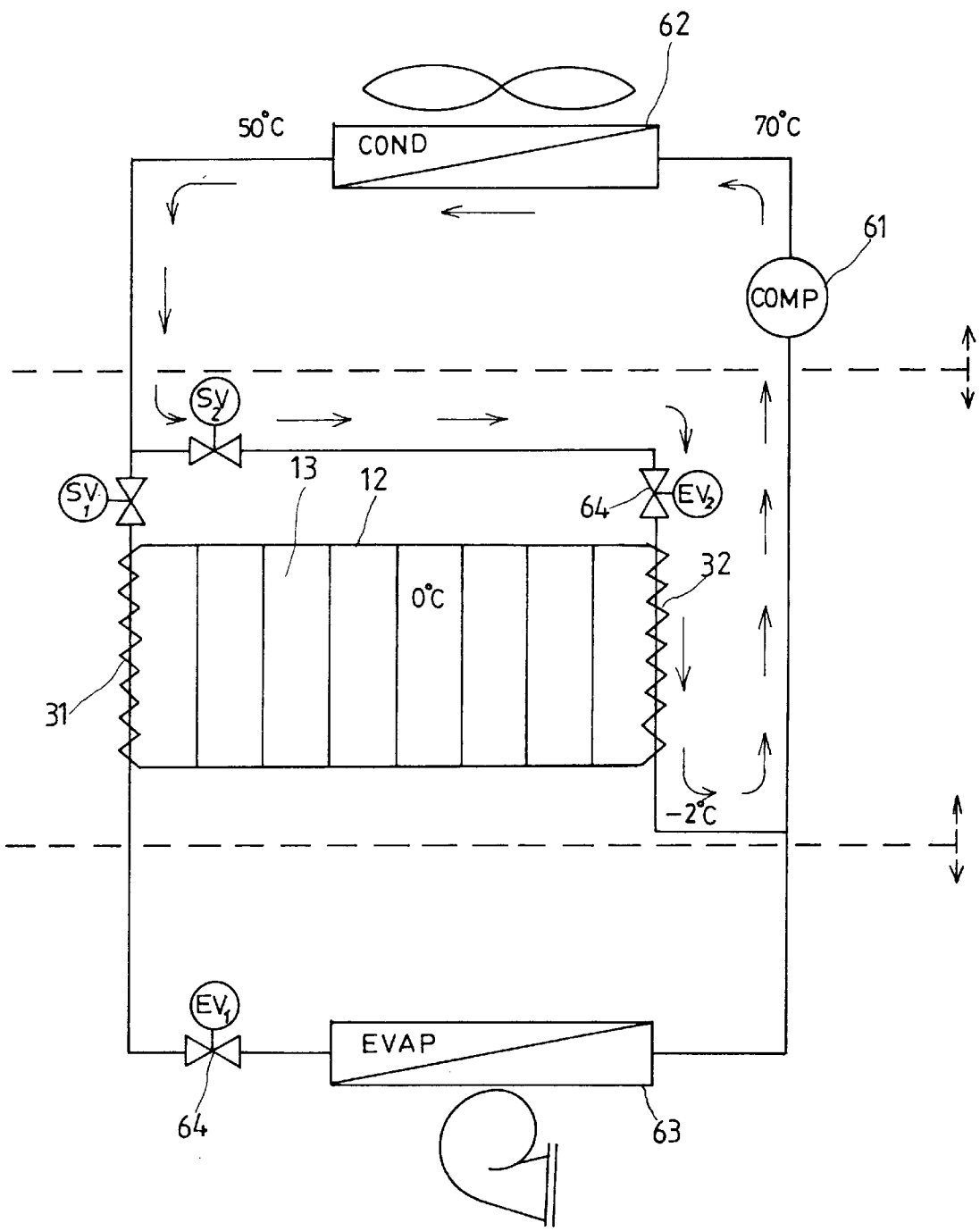
FIG. 8 illustrates the application of the thermal battery for cold storage according to the present invention in the night to charge, wherein the thermal battery uses water as the phase change medium.

In addition to the above-mentioned heat recuperation at exhaust pipe, the thermal battery of the present invention may also function like a cold storage or heat regenerator for using in a subcooled refrigerant ice bank cooling system as shown in FIG. 8. Such a subcooled refrigerant ice bank cooling system includes a thermal battery 12 which uses water as its phase change medium 13, so that ice can be made in the night at off-peak hours. At this point, a first electromagnetic valve SV1 in the refrigeration system is closed and a second electromagnetic valve SV2 is opened for refrigerant to flow through a second expansion valve EV2 at a temperature of −2° C. The low-temperature refrigerant flows through the low-temperature heat exchanger 32 of the thermal battery 12 and freezes the phase change medium (water) 13 into ice, the cold energy of which is stored in the thermal battery 12. When the condensing temperature is 50° C., ice can be made in the night at off-peak hours by the refrigeration system with a coefficient of performance COP=3.90; and, when an ambient temperature at off-peak hours in the night is low and the condensing temperature is reduced to 40° C, the ice-making can be operated with a higher coefficient of performance COP=5.19.

Figure 9:
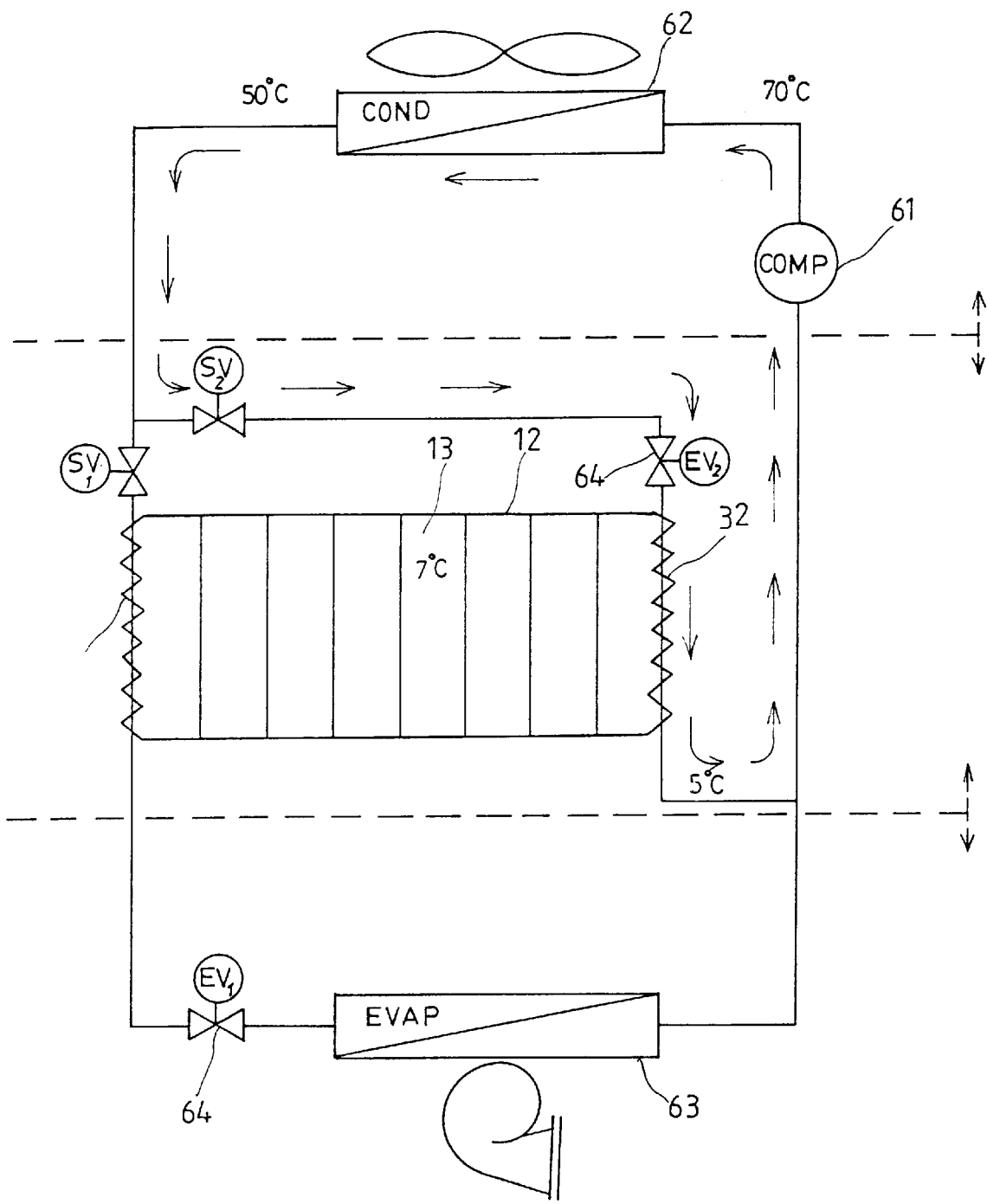
FIG. 9 illustrates the application of the thermal battery for cold storage according to the present invention in the night to charge, wherein the thermal battery uses eutectic salt as the phase change medium.

When ice is made in the night at off-peak hours with a thermal battery having water as its phase change medium 13 as above described, the temperature for water to freeze into ice is 0° C. However, the refrigerant flowing through the ice-making unit, that is, the low-temperature heat exchanger 32, has a temperature of −2° C. which is lower than 0° C. In other words, the refrigerant has a temperature that is 7° C. lower than the evaporating temperature (5° C.) needed in the air conditioning. If the phase change medium 13 of water is changed to other substance which has a phase change temperature of 7 or 8° C., then the coefficient of performance for cold storage can be increased. FIG. 9 illustrates a similar refrigeration system that has a thermal battery using eutectic salt as the phase change medium 13. The eutectic salt has a phase change temperature about 7° C. When the refrigeration system of FIG. 9 is utilized in the night to charge, the evaporating temperature of the phase change medium 13 can be 5° C. that is similar to that of the air conditioning system. Thus, when the condensing temperature is 50° C., the refrigeration system of FIG. 9 shall have a coefficient of performance the same as that of a conventional direct-expansion air-conditioning system. That is, COP=4.77.

Figure 10:
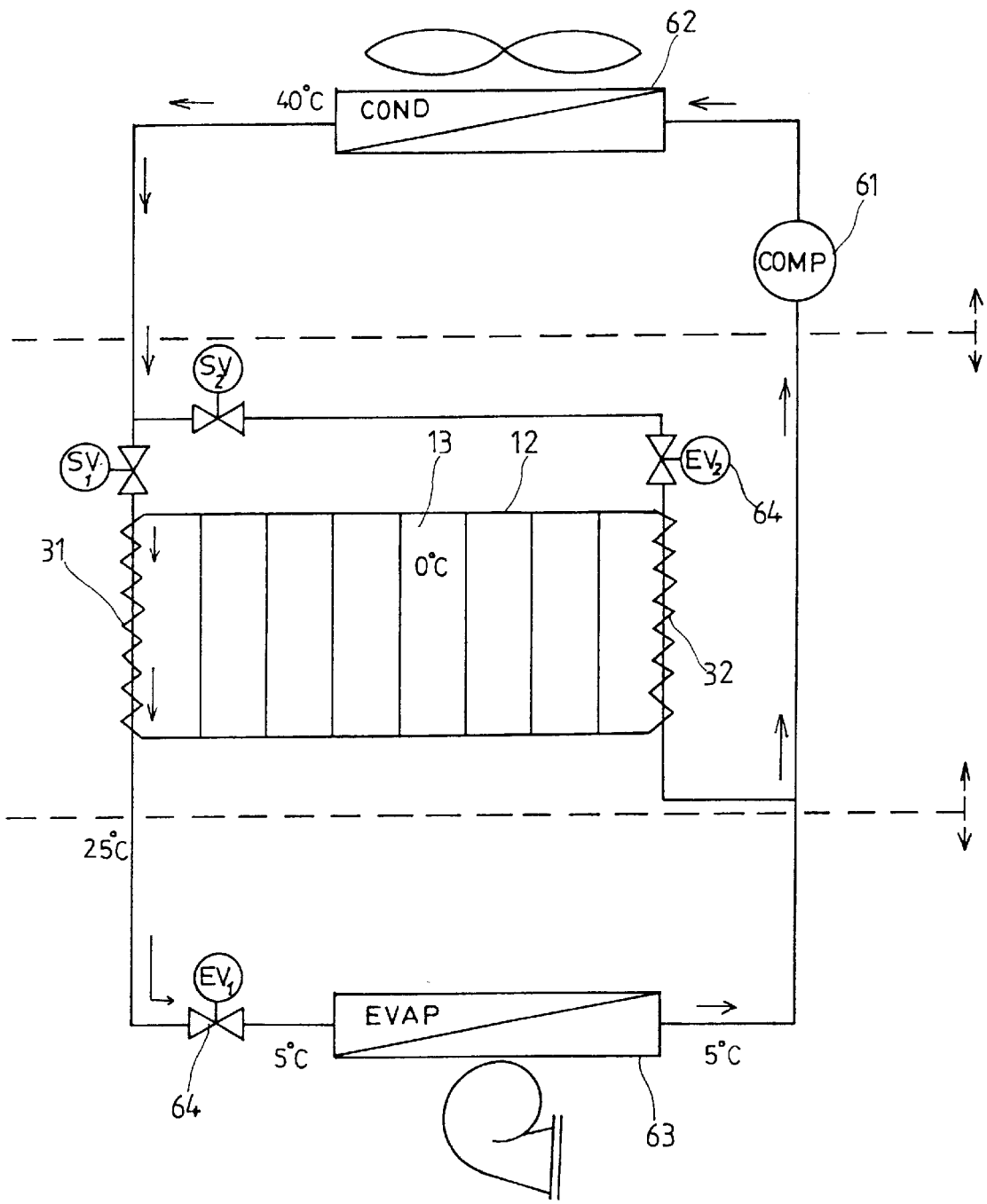
FIG. 10 illustrates the application of the thermal battery for cold storage according to the present invention in daytime to discharge and subcool the refrigerant, wherein the thermal battery uses water as the phase change medium.
Figure 11:
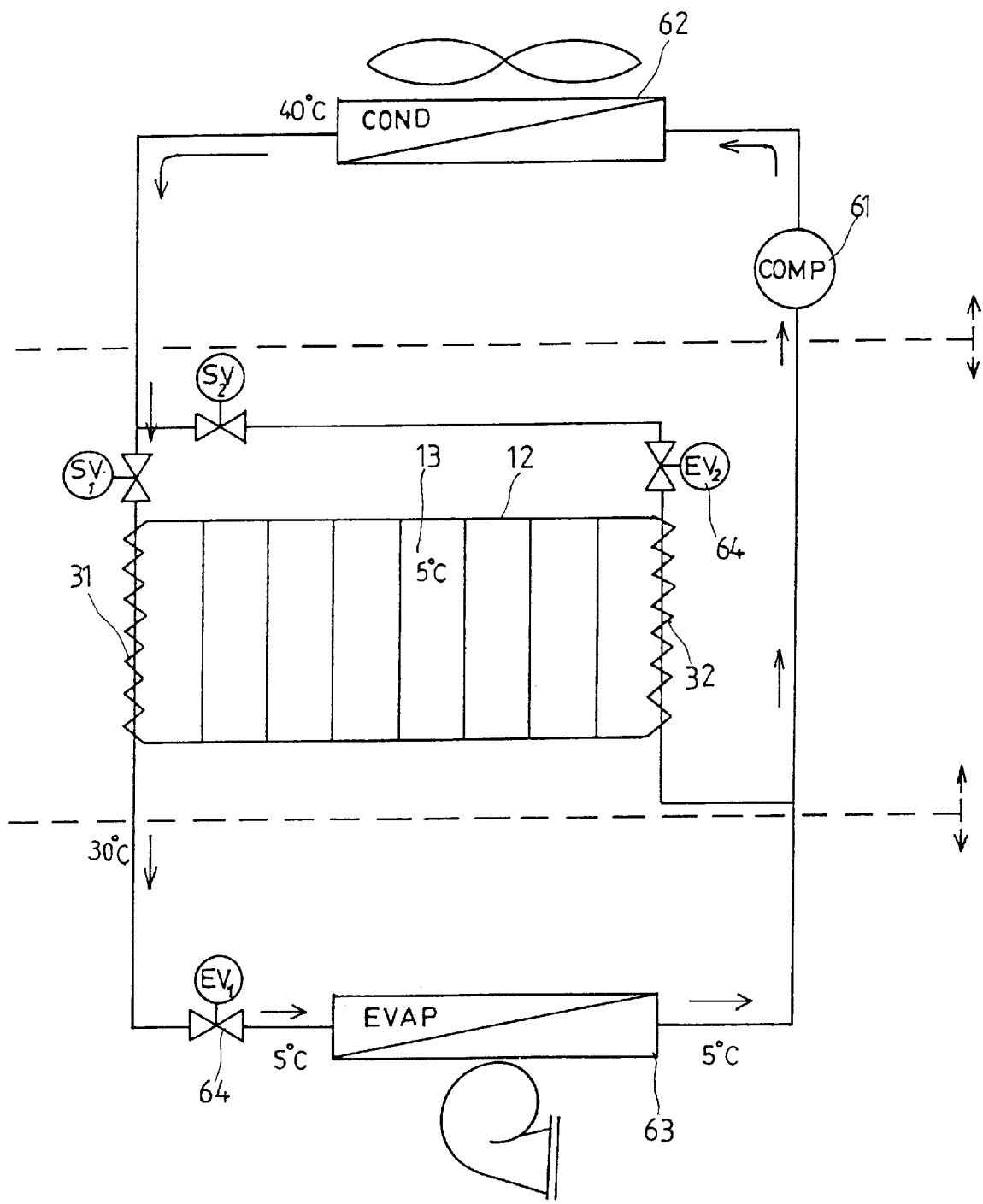
FIG. 11 illustrates the application of the thermal battery for cold storage according to the present invention in daytime to discharge and subcool the refrigerant, wherein the thermal battery uses eutectic salt as the phase change medium.

FIGS. 10 and 11 illustrate thermal batteries for cold storage with water and eutectic salt, respectively, as the phase change medium 13 to be used in the daytime at peak hours. In both cases, saturated refrigerant in the air-cooled condenser 62 passes the ice-melting unit, that is, the high-temperature heat exchanger 31, and becomes a subcooled refrigerant. At this point, the first electromagnetic valve SV1 is opened and the second electromagnetic valve SV2 is closed for the subcooled refrigerant to pass a first expansion valve EV1 (also indicated with reference numeral 64) and then the evaporator 63, so as to have an enhanced cooling effect. In the application as shown in FIG. 10, the condensing temperature is 40° C., the evaporating temperature is 5° C., and the subcooling temperature is 15° C. The thermal battery 12 with water as its phase change medium 13 shall operate at a coefficient of performance COP=7.37 when the ice is molten and the refrigerant becomes subcooled. The COP of 7.37 is 55% higher than that of a conventional air-cooled air conditioner. The application shown in FIG. 11 has the same condensing temperature and evaporating temperature as that in the application shown in FIG. 10. However, the thermal battery 12 in this application uses eutectic salt as its phase change medium and the subcooling temperature is 10° C. With these conditions, the thermal battery 12 releases cold and the subcooled refrigerant has a coefficient of performance of COP=7.10 that is 49% higher than that of the conventional air-cooled air conditioner.

Figure 12:
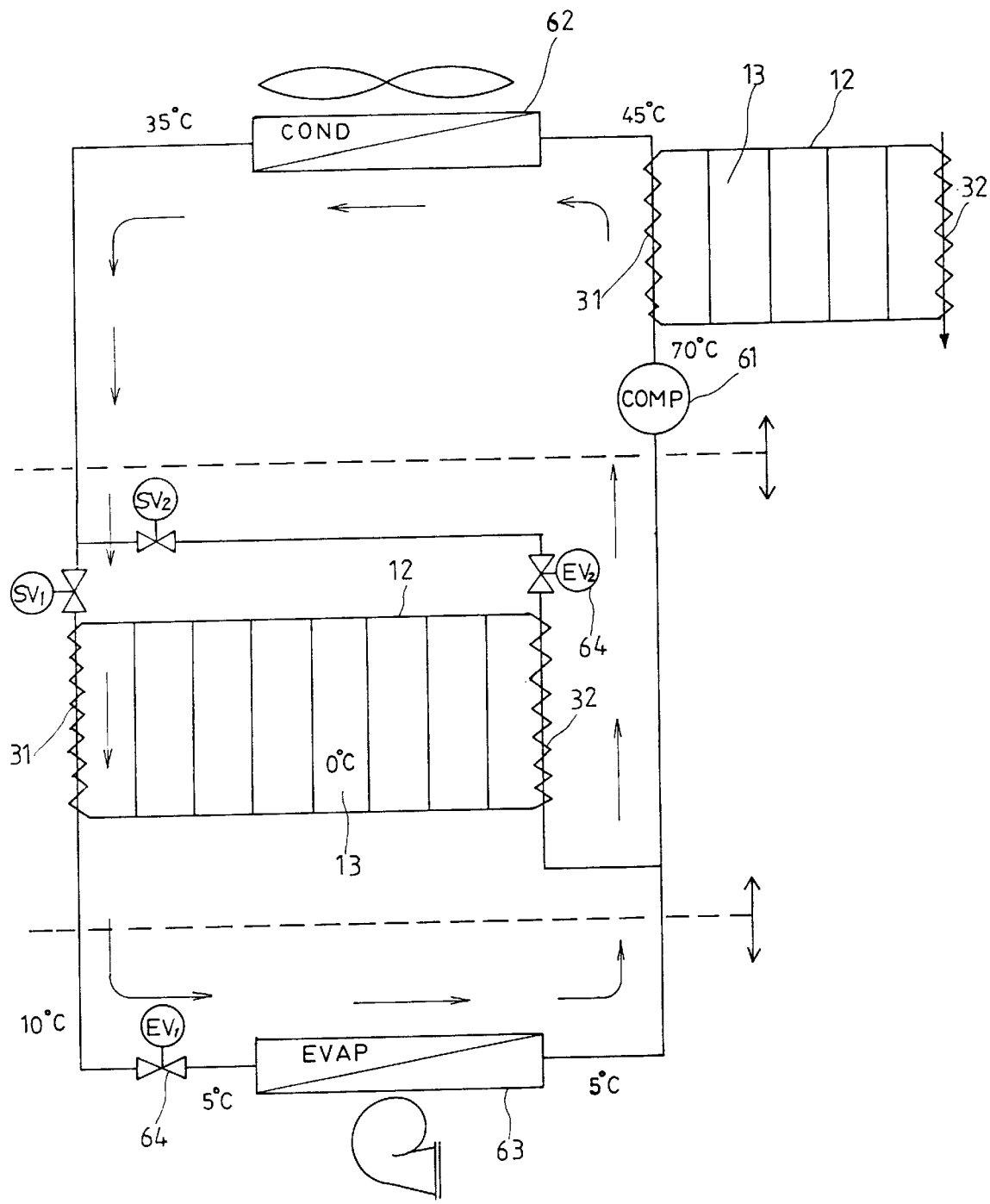
FIG. 12 illustrates the application of the thermal battery for heat storage and the water thermal battery for cold storage according to the present invention to recuperate heat at the exhaust pipe of a compressor of an air-conditioning system and to subcool the refrigerant of the system.
Figure 13:
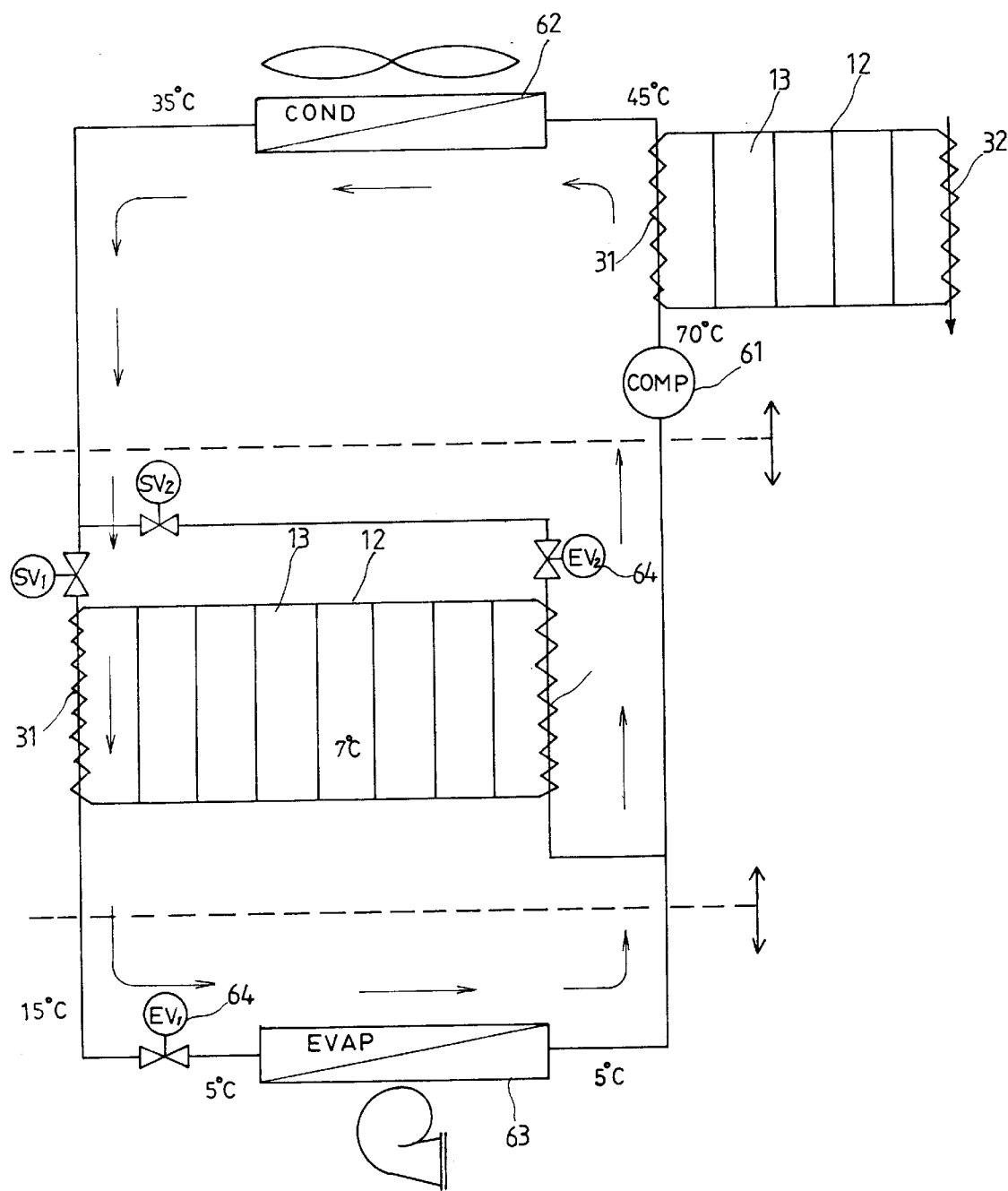
FIG. 13 illustrates the application of the thermal battery for heat storage and the eutectic salt thermal battery for cold storage according to the present invention to recuperate heat at the exhaust pipe of a compressor of an air-conditioning system and to subcool the refrigerant of the system.

The thermal battery for heat storage and the thermal battery for cold storage according to the present invention may also be used at the same time, wherein the thermal battery for heat storage recuperates and stores heat energy at the exhaust pipe of the compressor 61 for supplying hot water and the thermal battery for cold storage utilizes electrical power in the night to freeze the phase change medium 13 of water (FIG. 12) or eutectic salt (FIG. 13) and stores the cold energy which can be released (when the phase change medium 13 is molten from solid state into liquid state) during daytime at peak hours. The refrigerant is subcooled via the ice-melting subcooler, that is, the high-temperature heat exchanger 31, so that the subcooled refrigerant is supplied via the evaporator 63 to provide cold energy required by the air conditioning. In this application, the thermal batteries reduce the condensing temperature at high pressure, and the subcooled refrigerant provides enhanced cooling effect for the air conditioner to operate at higher coefficient of performance during daytime at peak hours. In the application shown in FIG. 12, water is used as the phase change medium 13 which provides a subcooling temperature of 15° C., a condensing temperature of 35° C., and a coefficient of performance of COP=8.81 that is 85% higher than that of the conventional air conditioner. And, in the application shown in FIG. 13, eutectic salt is used as the phase change medium 13 to provide a subcooling temperature of 10° C. and a coefficient of performance of COP=8.51 that is 78% higher than that of the conventional air conditioner.

FIG. 14 shows a further application of the present invention in which eutectic salt is used as the phase change medium 13 so that the flowing fluid F2 passing the low-temperature heat exchanger 32 has a working temperature of 5° C. that is the same as the evaporating temperature required in the air conditioning, and a proportional tee valve PV is used to replace the previous two electromagnetic valves. A system according to the application of FIG. 14 may utilize off-peak power and low ambient temperature in the night to store cold. In the daytime, the thermal battery releases cold to subcool the refrigerant, so that an improved air-conditioning performance can be achieved at lower power consumption at off-peak hours. With the proportional tee valve PV, the thermal battery is allowed to store and release heat at the same time at a proportion decided by the load required by the air conditioning. FIG. 15 illustrates an application in which the thermal battery reduces power needed by air conditioning at peak hours to increase operating efficiency of the air conditioner while the thermal battery recuperates and stores heat from the exhaust pipe for supplying hot water in daily use.

Following is a table showing and comparing the coefficients of performance of different applications of the present invention illustrated herein above:

| REFRIGERANT CIRCULATING MANNER | FIG. NO. | COND. TEMP. (° C.) | EVAP. TEMP. (° C.) | SUB COOLING TEMP. (° C.) | COMP. RATIO (C.R) | COP | EFFICIENCY PCTG(%) |
|---|---|---|---|---|---|---|---|
| 1) Traditional air-cooled direct-expansion air-conditioning system | 6 | 50° C. | 5° C. | 0° C. | 3.33 | 4.77 | 100% |
| 2) Heat recuperating thermal battery air-cooled direct-expansion | 7 | 40° C. | 5° C. | 0° C. | 2.63 | 6.56 | 138% |
| 3) Water thermal battery for cold | 8 | 50° C. | −2° C. | 0° C. | 4.17 | 3.90 | 82% |

-continued

| REFRIGERANT CIRCULATING MANNER | FIG. NO. | COND. TEMP. (° C.) | EVAP. TEMP. (° C.) | SUB COOLING TEMP. (° C.) | COMP. RATIO (C.R) | COP | EFFICIENCY PCTG(%) |
|---|---|---|---|---|---|---|---|
| storage, ice-making in the night at off-peak hours | | 40° C. | −2° C. | 0° C. | 3.29 | 5.19 | 109% |
| 4) Eutectic salt thermal battery for cold storage, ice-making in the night at off-peak hours | 9 | 50° C.<br>40° C. | 5° C.<br>5° C. | 0° C.<br>0° C. | 3.33<br>2.63 | 4.77<br>6.56 | 100%<br>138% |
| 5) Water thermal battery for cold storage, ice-melting in daytime to subcool the refrigerant | 10 | 40° C. | 5° C. | 15° C. | 2.63 | 7.37 | 155% |
| 6) Eutectic salt thermal battery for cold storage, melting and releasing cold in daytime to subcool the refrigerant | 11 | 40° C. | 5° C. | 10° C. | 2.63 | 7.10 | 149% |
| 7) Water thermal battery for cold storage & heat recuperating thermal battery, ice-melting in daytime to subcool the refrigerant | 12 | 35° C. | 5° C. | 15° C. | 2.32 | 8.81 | 185% |
| 8) Eutectic salt thermal battery for cold storage & heat recuperating thermal battery, ice-melting in daytime to subcool the refrigerant | 13 | 35° C. | 5° C. | 10° C. | 2.32 | 8.51 | 178% |

What is claimed is:

1. A heat type thermal battery for storing, releasing and utilizing heat and cold energies comprising an energy storing chamber, a heat pipe circuit, a high-temperature heat exchanger serving as a heat source, and a low-temperature heat exchanger serving as a heat sink;

said energy storing chamber being filled with phase change medium therein and being covered around outer surfaces with thermal insulating material, top cover and bottom drain being provided at top and bottom of said energy storing chamber, respectively;

said heat pipe circuit including a plurality of vertically arranged parallel heat pipes that are located inside said energy storing chamber and have fins densely arranged around outer surfaces thereof, a vertical high-temperature heat transfer pipe and a vertical low-temperature heat transfer pipe that are separately located at two outer sides of said energy storing chamber and have fins provided on inner and outer surfaces thereof, and an upper and a lower horizontal pipe that respectively connect and communicate upper and lower ends of said parallel heat pipes, said vertical high-temperature heat transfer pipe, and said low-temperature heat transfer pipe; working fluid being filled in said heat pipe circuit, and a pressure-limiting safety chamber located outside said energy storing chamber being connected to said vertical high-temperature heat transfer pipe at a predetermined point; and said high-temperature heat exchanger serving as a heat source and said low-temperature heat exchanger serving as a heat sink being located outside said energy storing chamber to form flowing fluid passages and enclose said vertical high-temperature heat transfer pipe and said vertical low-temperature heat transfer pipe, respectively, and thermal insulating material bing provided around outer surfaces of said high-temperature and said low-temperature heat exchangers; and wherein said high-temperature heat exchanger serving as a heat source has high-temperature flowing fluid passing therethrough to boil said working fluid flowing through said vertical high-temperature heat transfer pipe, and said boiled working fluid condensing in said vertically arranged parallel heat pipes and melting said phase change medium filled in said energy storing chamber, whereby heat energy is transferred from said high-temperature flowing fluid to said working fluid and then stored in said phase change medium in said thermal battery; and wherein said low-temperature heat exchanger serving as a heat sink has low-temperature flowing fluid passing therethrough to absorb energy stored in said phase change medium of said thermal battery to obtain an increased enthalpy value by cooling said working fluid flowing through said vertical low-temperature heat transfer pipe, and said cooled working fluid boiling in said vertically arranged parallel heat pipes and solidifying said phase change medium filled in said energy storing chamber, whereby heat energy stored in said phase change medium in said thermal battery is released and absorbed by said working fluid.

2. A heat pipe circuit type thermal battery as claimed in claim 1, wherein said high-temperature flowing fluid and said low-temperature flowing fluid simultaneously flow through said high-temperature heat exchanger and said low-temperature heat exchanger, respectively, whereby energy in said high-temperature flowing fluid is directly transferred to said low-temperature flowing fluid while said thermal battery storing extra energy contained in said high-temperature flowing fluid into said phase change medium or releasing additional energy to said low-temperature flowing fluid in the event insufficient heat energy is supplied by said high-temperature flowing fluid.

* * * * *